United States Patent
Xu et al.

(10) Patent No.: US 9,860,889 B2
(45) Date of Patent: Jan. 2, 2018

(54) METHODS FOR INDICATING AND DETERMINING UPLINK/DOWNLINK CONFIGURATION, BASE STATION AND TERMINAL

(71) Applicant: CHINA ACADEMY OF TELECOMMUNICATIONS TECHNOLOGY, Beijing (CN)

(72) Inventors: Jing Xu, Beijing (CN); Xueming Pan, Beijing (CN); Zukang Shen, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 14/899,802

(22) PCT Filed: Jul. 15, 2014

(86) PCT No.: PCT/CN2014/082271
§ 371 (c)(1),
(2) Date: Dec. 18, 2015

(87) PCT Pub. No.: WO2015/007208
PCT Pub. Date: Jan. 22, 2015

(65) Prior Publication Data
US 2016/0143007 A1  May 19, 2016

(30) Foreign Application Priority Data
Jul. 16, 2013  (CN) .......................... 2013 1 0298144

(51) Int. Cl.
*H04W 72/04* (2009.01)
*H04L 5/00* (2006.01)
*H04L 5/14* (2006.01)

(52) U.S. Cl.
CPC ......... *H04W 72/042* (2013.01); *H04L 5/0053* (2013.01); *H04L 5/14* (2013.01); *H04L 5/1469* (2013.01)

(58) Field of Classification Search
CPC ....... H04L 5/0053; H04L 5/14; H04L 5/1469; H04W 72/042
(Continued)

(56) References Cited

U.S. PATENT DOCUMENTS

2008/0313678 A1* 12/2008 Ryu .................. H04N 21/2381
725/62
2012/0320806 A1* 12/2012 Ji ........................ H04B 7/2656
370/280
(Continued)

FOREIGN PATENT DOCUMENTS

| CN | 102547993 A | 7/2012 |
|---|---|---|
| CN | 102594438 A | 7/2012 |

(Continued)

OTHER PUBLICATIONS

Samsung, "PUCCH Format 1a/1b Resources in Response to ePDCCH Detections", 3GPP TSG RAN WG1 #70, R1-123491, Aug. 13-17, 2012, Qingdao, China.
(Continued)

Primary Examiner — Mark Rinehart
Assistant Examiner — Kenneth P Hunt
(74) Attorney, Agent, or Firm — Pro-Techtor International Services; Ian Oglesby

(57) ABSTRACT

The present disclosure provides methods for indicating and determining uplink/downlink configuration, a base station and a terminal. A base station transmits uplink/downlink configuration information to at least one terminal via a DCI message, the DCI message is provided with at least one uplink/downlink configuration information domain for car-
(Continued)

rying the uplink/downlink configuration information, and at least one of the uplink/downlink configuration information domains in the DCI message is parsed by the at least one terminal. The at least one terminal parses the received DCI message in accordance with predetermined DCI configuration information, and acquires its own uplink/downlink configuration from a corresponding position in the DCI message.

20 Claims, 8 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2013/0188516 A1* | 7/2013 | He ....................... | H04W 28/16 370/254 |
| 2015/0003425 A1 | 1/2015 | Kim et al. | |
| 2015/0358998 A1* | 12/2015 | Golitschek Edler Von Elbwart ............... | H04W 48/16 370/280 |
| 2016/0044638 A1* | 2/2016 | Gao .................... | H04W 72/042 370/280 |

FOREIGN PATENT DOCUMENTS

| | | |
|---|---|---|
| CN | 102740477 A | 10/2012 |
| CN | 102791036 A | 11/2012 |
| CN | 102958058 A | 3/2013 |
| EP | 2690806 A2 | 1/2014 |
| WO | WO2012128599 A2 | 9/2012 |
| WO | WO2013024335 A2 | 2/2013 |
| WO | WO2013051856 A1 | 4/2013 |

OTHER PUBLICATIONS

ITRI "Correction of serving cell UL/DL configuration for transmitting the PUSCH" 3GPP TSG-RAN WG1 Meeting #72bis, R1-131072, Apr. 15-19, 2013, Chicago, USA.
LG Electronics, "Signaling Mechanisms for TDD eIMTA" 3GPP TSG RAN WG1 Meeting #73, R1-132231, May 20-24, 2013, Fukuoka, Japan.
Mitsubishi Electric, "DCI format for multi-cluster PUSCH resource allocation" 3GPP TSG RAN WG1 #61bis meeting, R1-103621, Jun. 28-Jul. 2, 2010 ,Dresden, Germany.
Samsung, "Remaining Issue on PUSCH Cross-Carrier Scheduling Case D in Inter-band CA", 3GPP TSG-RAN WG1 Meeting #71, R1-124908, Nov. 12-16, 2012, New Orleans, USA.
Panasonic, "Signalling mechanisms for TDD UL-DL reconfiguration" 3GPP TSG RAN WG1 Meeting #72, R1-130321, Jan. 28-Feb. 1, 2013, St Julian's, Malta.
First Office Action regarding Chinese Application No. 201310298144.5, dated Mar. 15, 2017.Translation provided by EPO.
EPO Supplementary Search Report and Opinion for EPO application No. 14827122.4 dated Oct. 31, 2016.
International Search Report and Written Opinion of the International Searching Authority for International Application No. PCT/CN2014/082271, dated Oct. 22, 2014. Translation provided by WIPO.
Office action from Japanese Patent Application No. 2016-526431 dated Jan. 24, 2017, and its English translation.
Office action from Korean Patent Application No. 10-2015-7035399 dated Mar. 20, 2017, and its English translation.
Office action from TW Patent Application No. 103124196 dated Nov. 25, 2015, and its English translation.

* cited by examiner

Five Continuous CCS Each Having a Bandwidth Of 20MHz Are Aggregated
into a System Bandwidth Of 100MHz Two Discontinuous CCs Each Having a Bandwidth of 20MHz are Aggregated
into a System Bandwidth of 40MHz

METHODS FOR INDICATING AND DETERMINING UPLINK/DOWNLINK CONFIGURATION, BASE STATION AND TERMINAL

CROSS-REFERENCE TO RELATED APPLICATION

This application is the U.S. national phase of PCT Application No PCT/CN2014/082271 filed on Jul. 15, 2014, which claims a priority of the Chinese Patent Application No. 201310298144.5 filed on Jul. 16, 2013 and entitled "Methods For Indicating And Determining Uplink/Downlink Configuration, Base Station And Terminal", the disclosures of which are incorporated in their entirety by reference herein.

TECHNICAL FIELD

The present disclosure relates to the field of communication technology, in particular to methods for indicating and determining uplink/downlink configuration, a base station and a terminal.

BACKGROUND

As one of the two basic duplex modes, a Time Division Duplexing (TDD) mode has attracted more and more attentions due to an increasing demand on bandwidth for broadband mobile communication. In a TDD system, an identical frequency resource is used for both uplink and downlink transmission, and uplink/downlink signals are transmitted in different timeslots. In a public TDD system, e.g., a 3G-based Time Division-Synchronization Code Division Multiple Access (TD-SCDMA) system or a 4G-based TD-SCDMA Long Term Evolution (TD-LTE) system, the uplink and downlink timeslots are divided statically or semi-statically. Usually, during the network planning, a proportion of the uplink timeslot to the downlink timeslot is determined in accordance with a cell type and an approximate service ratio, and this proportion will remain unchanged. This method is simple and effective in the case that large coverage is provided by a macrocell. As specified in the 3$^{rd}$ Generation Partnership Project (3GPP) LTE Release 8/9/10, a frame structure in FIG. 1 is adopted in the TDD mode. There exist seven modes for uplink-downlink subframe allocation as shown in Table 1.

TABLE 1

Modes for Uplink-Downlink Subframe Allocation

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Along with the development of the technology, more and more low-power base stations, e.g., Pico cell and Home NodeB, have been deployed so as to provide small local coverage. In these microcells, there is relatively a small amount of terminals as well as a relatively large change in the requirement on terminal services. Hence, the requirement on the ratio of the uplink service to the downlink service for these cells may be dynamically changed. Although the TD-LTE standard, for example, also supports to change online the proportion of uplink timeslot to the downlink timeslot of the cell, a complex signaling procedure and additional configuration time are required, so the system performance will be degraded and it is impossible to track the service change in real time.

Based on the above, a Rel-11 research project "Further Enhancements to LTE TDD for DL-UL Interference Management and Traffic Adaptation" (3GPP TR36.828) has been launched by the 3GPP, so as to study the ways for the flexible change of UpLink-DownLink (UL-DL) subframe allocation in the microcells in accordance with the service requirements. One of the ways includes transmitting, by a base station, information about the TDD UL-DL subframe configuration to a terminal using a channel and/or signal at a physical layer. This way may support the change of the UL-DL subframe allocation in a radio frame once per 10 ms. A typical physical layer signaling method includes indicating the information about the TDD UL-DL subframe configuration using a Downlink Control Indicator (DCI), especially using an existing DCI format.

The DCI is mainly carried by a Physical Downlink Control Channel (PDCCH) so as to effectively transmit uplink/downlink scheduling information and the relevant public control information. Currently, 10 DCI formats have been defined in an LTE system, and their principal functions are shown in Table 2.

TABLE 2

Functions of 10 DCI Formats

| DCI Format | Function |
|---|---|
| 0 | Used for Scheduling UL transmission on the PUSCH |
| 1 | Used for Scheduling transmission of one codeword on the PDSCH |
| 1A | Used for compact Scheduling of one codeword on the PDSCH |
| 1B | Used for compact Scheduling of one codeword on the PDSCH with precoding information |
| 1C | Used for very compact Scheduling of one codeword on the PDSCH |
| 1D | Used for compact Scheduling of one codeword on the PDSCH with precoding information and power offset information |
| 2 | Used for Scheduling of two codewords on the PDSCH with closed-loop spatial multiplexing |
| 2A | Used for Scheduling of two codewords on the PDSCH with open-loop spatial multiplexing |
| 3 | Used for Transmitting power control information for PUCCH and PUSCH with 2-bit indicator for a group of users |
| 3A | Used for Transmitting power control information for PUCCH and PUSCH with 1-bit indicator for a group of users |

The DCI message bit is checked by a Cyclic Redundancy Check (CRC) and added with CRC information. Its CRC information bit is scrambled with a Radio Network Temporary Identifier (RNTI), and then channel coding and rate matching are performed.

Depending on their functions, the DCI formats may be further divided into four principal types, including DCI format for scheduling Physical Uplink Shared Channel (PUSCH), e.g., DCI format 0, DCI formats for scheduling Physical Downlink Shared Channel (PDSCH), e.g., DCI formats 1, 1A, 1B, 1D, 2 and 2A; DCI formats for scheduling public control information, e.g., DCI formats 1A and 1C; and DCI formats for scheduling multicast power control information, e.g., DCI formats 3 and 3A.

As an optimum detection algorithm, maximum likelihood detection algorithm may be used to completely acquire reception diversity gains. However, this algorithm is too complex, and during the detection, it is required to traverse all possible transmission vectors. When the DCI message having a length of $N_L$ and coded with an M-base system is to be transmitted, it is required to traverse all the $M^{N_L}$ dedicated symbol vectors in the space. Taking the DCI format 1C (20M) with the least bits as an example, when M=2 and $N_L$=15, $M^{N_L}$=32768. The resultant volume of search queries is unacceptable in an actual system. Hence, the maximum likelihood detection algorithm may be applicable only when there are few valid bits.

Basic Principle of Carrier Aggregation

An LTE R8 carrier is used as a basic unit, each LTE R8 carrier constitutes a Component Carrier (CC), and a plurality of CCs is aggregated to provide a greater bandwidth. Each carrier has a maximum bandwidth of 20 MHz. This multi-carrier mode is called as a carrier aggregation mode. As shown in FIG. 2, five CCs each having a bandwidth of 20 MHz are aggregated to provide a bandwidth of 100 MHz.

There are two ways for the carrier aggregation. One of the ways includes the aggregation of a plurality of continuous carriers within a band, and in order to facilitate the operator's flexible use of spectra, it also supports the aggregation of a plurality of discontinuous spectra. For the continuous carrier aggregation, all the CCs belong to an identical band, and for the discontinuous carrier aggregation, the aggregated CCs may be located within an identical band or different bands. As shown in FIG. 3, which is a schematic view of the discontinuous carriers, the two cross-band CCs each having a bandwidth of 20 MHz are aggregated into a multi-carrier system having a bandwidth of 40 MHz.

Scenarios for Coordinated Multi-Point Operation

Scenario 1: intra-site coordination in a homogenous network, as shown in FIG. 4a.

Scenario 2: coordination of multiple transmission nodes in a homogeneous network (intra-eNB), as shown in FIG. 4b.

Scenario 3: coordination of multiple transmission nodes in a heterogeneous network, where multiple low-power nodes are deployed within the coverage of a macro base station, and a separate cell identifier (ID) is configured for each transmission node, as shown in FIG. 4c.

Scenario 4: coordination of multiple transmission nodes in a heterogeneous network, where multiple low-power nodes are deployed within the coverage of a macro base station, and an identical cell ID is configured for all the transmission nodes, as shown in FIG. 4c Scenario 4 differs from Scenario 3 essentially in that the identical cell ID is configured for all the transmission nodes, and uniform cell-level public information (e.g., a public DCI message) is transmitted via the transmission nodes. As shown in FIG. 4d, the uplink/downlink configuration information may be separately configured for each transmission node, and the identical public DCI message is transmitted via all the transmission nodes.

It can therefore be seen that, in spite of various uplink/downlink configuration, there is no method for indicating the TDD uplink/downlink configuration information.

SUMMARY

An object of the present disclosure is to provide methods for indicating and determining uplink/downlink configuration, a base station and a terminal, so as to indicate TDD uplink/downlink configuration information.

In one aspect, the present disclosure provides in some embodiments a method for indicating uplink/downlink configuration, including steps of: determining, by a base station, uplink/downlink configuration information, and transmitting, by the base station, the uplink/downlink configuration information to at least one terminal via a DCI message, so that the at least one terminal parses the DCI message in accordance with predetermined DCI configuration information and determines its own uplink/downlink configuration from the DCI message, the DCI message including at least one uplink/downlink configuration information domain, at least one of the uplink/downlink configuration information domains included in the DCI message being parsed by the at least one terminal, the uplink/downlink configuration information domain being configured to carry the uplink/downlink configuration information.

According to the method in the embodiments of the present disclosure, the base station transmits the uplink/downlink configuration information to the at least one terminal via the DCI message, so that the terminal may parse the DCI message in accordance with the predetermined DCI configuration information, and acquire its own uplink/downlink configuration from a corresponding position in the DCI message. As a result, it is able for the base station to indicate the TDD uplink/downlink configuration information of the terminal.

Further, in order to enable the base station to transmit new DCI configuration information corresponding to the terminal to the terminal in time when transmission nodes of the terminal, its carrier states or its conditions supporting flexible uplink/downlink configuration have been changed, the method further includes transmitting, by the base station, the new DCI configuration information corresponding to the terminal to the terminal when the base station determines that the transmission nodes of the terminal, its carrier states or its conditions supporting flexible uplink/downlink configuration have been changed.

In order to enable the terminal to determine the position of the uplink/downlink configuration in the DCI message in a convenient manner, the DCI configuration information includes an uplink/downlink configuration information domain index value corresponding to the terminal. The uplink/downlink configuration information domain index value is configured to determine the position of the uplink/downlink configuration information related to the terminal in the DCI message, and the terminal determines its uplink/downlink configuration from the DCI message in accordance with the uplink/downlink configuration information domain index value.

Further, the DCI message is scrambled with a CRC through a predetermined TDD-RNTI. The DCI configuration information further includes TDD-RNTI information of the DCI message corresponding to the terminal, and the terminal parses the DCI message in accordance with the TDD-RNTI information.

Further, when there is a vacant region in the DCI message, in order to facilitate the detection by the terminal, the DCI configuration information further includes a length of a valid information domain in the DCI message, or a length of the vacant region in the DCI message.

Alternatively, the uplink/downlink configuration information domain corresponds to one carrier and/or one transmission node.

In order to utilize system resources in a better manner, a length of the uplink/downlink configuration information domain is 3 bits.

Alternatively, the step of transmitting, by the base station, the uplink/downlink configuration information to the at least one terminal via the DCI message includes transmitting, by the base station, the uplink/downlink configuration information to the at least one terminal via the DCI message in a Physical Downlink Control Channel (PDCCH) or Enhanced Physical Downlink Control Channel (EPDCCH) common search space.

There are two transmission modes which include carrying the uplink/downlink configuration information about a current CC in the DCI message transmitted over each CC, and carrying the uplink/downlink configuration information about the CCs aggregated at the terminal in the DCI message transmitted in a primary cell of each terminal. When the uplink/downlink configuration information about the CCs aggregated at the terminal is carried in the DCI message transmitted in the primary cell of each terminal, the step of transmitting, by the base station, the uplink/downlink configuration information to the at least one terminal via the DCI message includes acquiring, by the base station, the uplink/downlink configuration of the transmission nodes and/or carriers for each terminal that receives the DCI message, and transmitting the acquired uplink/downlink configuration information to each terminal via the DCI message.

Alternatively, a vacant bit in the DCI message is set as a pre-agreed constant value, so as to facilitate the detection by the terminal.

In another aspect, the present disclosure provides in some embodiments a method for determining uplink/downlink configuration, including steps of receiving, by a terminal, a DCI message from a base station, the DCI message including at least one uplink/downlink configuration information domain, at least one of the uplink/downlink configuration information domains included in the DCI message being parsed by at least one terminal, and the uplink/downlink configuration information domain being configured to carry uplink/downlink configuration information; and parsing, by the terminal, the DCI message in accordance with predetermined DCI configuration information, and determining its own uplink/downlink configuration from the DCI message.

According to the method in the embodiments of the present disclosure, the base station transmits the uplink/downlink configuration information to the at least one terminal via the DCI message, so that the terminal may parse the DCI message in accordance with the predetermined DCI configuration information, and acquire its own uplink/downlink configuration from a corresponding position in the DCI message. As a result, it is able for the terminal to determine the TDD uplink/downlink configuration information.

Further, in order to enable the base station to transmit new DCI configuration information corresponding to the terminal to the terminal in time when transmission nodes of the terminal, its carrier states or its conditions supporting flexible uplink/downlink configuration have been changed, the method further includes receiving, by the terminal, the new DCI configuration information corresponding to the terminal from the base station when the base station determines that the transmission nodes of the terminal, its carrier states or its conditions supporting flexible uplink/downlink configuration have been changed.

In order to enable the terminal to determine the position of the uplink/downlink configuration in the DCI message in a convenient manner, the DCI configuration information includes an uplink/downlink configuration information domain index value corresponding to the terminal. The uplink/downlink configuration information domain index value is configured to determine the position of the uplink/downlink configuration information related to the terminal in the DCI message. The step of determining, by the terminal, its own uplink/downlink configuration from the DCI message in accordance with the predetermined DCI configuration information includes determining, by the terminal, its uplink/downlink configuration from the DCI message in accordance with the uplink/downlink configuration information domain index value.

Further, the DCI message is scrambled with a CRC through a predetermined TDD-RNTI. The DCI configuration information further includes TDD-RNTI information of the DCI message corresponding to the terminal. The step of parsing, by the terminal, the DCI message in accordance with the predetermined DCI configuration information includes parsing, by the terminal, the DCI message in accordance with the TDD-RNTI information.

Further, when there is a vacant region in the DCI message, in order to facilitate the detection by the terminal, the DCI configuration information further includes a length of a valid information domain in the DCI message, or a length of the vacant region in the DCI message. The step of parsing, by the terminal, the DCI message in accordance with the predetermined DCI configuration information includes performing, by the terminal, maximum likelihood detection on the DCI message in accordance with the length of the valid information domain in the DCI message or the length of the vacant region in the DCI message.

Alternatively, the uplink/downlink configuration information domain corresponds to one carrier and/or one transmission node.

In order to utilize system resources in a better manner, a length of the uplink/downlink configuration information domain is 3 bits.

Alternatively, the step of receiving, by the terminal, the DCI message from the base station includes receiving, by the terminal, the DCI message from the base station in a PDCCH or EPDCCH common search space.

There are two transmission modes which include carrying the uplink/downlink configuration information about a current CC in the DCI message transmitted over each CC, and carrying the uplink/downlink configuration information about the CCs aggregated at the terminal in the DCI message transmitted in a primary cell of each terminal.

Further, the DCI message is scrambled with the CRC through the predetermined TDD-RNTI.

Alternatively, a vacant bit in the DCI message is set as a pre-agreed constant value.

In yet another aspect, the present disclosure provides in some embodiments a base station, including: a determination unit configured to determine uplink/downlink configuration information; and a transmission unit configured to transmit the uplink/downlink configuration information to at least one terminal via a DCI message, so that the at least one terminal parses the DCI message in accordance with predetermined DCI configuration information and determines its own uplink/downlink configuration from the DCI message, the DCI message including at least one uplink/downlink configuration information domain, at least one of the uplink/downlink configuration information domains included in the DCI message being parsed by the at least one terminal, the uplink/downlink configuration information domain being configured to carry the uplink/downlink configuration information.

According to the base station in the embodiments of the present disclosure, it transmits the uplink/downlink configuration information to the at least one terminal via the DCI message, so that the terminal may parse the DCI message in accordance with the predetermined DCI configuration information, and acquire its own uplink/downlink configuration from a corresponding position in the DCI message. As a result, it is able for the base station to indicate the TDD uplink/downlink configuration information of the terminal.

Further, in order to enable the base station to transmit new DCI configuration information corresponding to the terminal to the terminal in time when transmission nodes of the terminal, its carrier states or its conditions supporting flexible uplink/downlink configuration have been changed, the transmission unit is further configured to transmit the new DCI configuration information corresponding to the terminal to the terminal when the base station determines that the transmission nodes of the terminal, its carrier states or its conditions supporting flexible uplink/downlink configuration have been changed.

In order to enable the terminal to determine the position of the uplink/downlink configuration in the DCI message in a convenient manner, the DCI configuration information includes an uplink/downlink configuration information domain index value corresponding to the terminal. The uplink/downlink configuration information domain index value is configured to determine the position of the uplink/downlink configuration information related to the terminal in the DCI message, and the terminal determines its uplink/downlink configuration from the DCI message in accordance with the uplink/downlink configuration information domain index value.

Further, the DCI message is scrambled with a CRC through a predetermined TDD-RNTI. The DCI configuration information further includes TDD-RNTI information of the DCI message corresponding to the terminal, and the terminal parses the DCI message in accordance with the TDD-RNTI information.

Further, when there is a vacant region in the DCI message, in order to facilitate the detection by the terminal, the DCI configuration information further includes a length of a valid information domain in the DCI message, or a length of the vacant region in the DCI message.

Alternatively, the uplink/downlink configuration information domain corresponds to one carrier and/or one transmission node.

In order to utilize system resources in a better manner, a length of the uplink/downlink configuration information domain is 3 bits.

Alternatively, the transmission unit is configured to transmit the uplink/downlink configuration information to the at least one terminal via the DCI message in a PDCCH or EPDCCH common search space.

There are two transmission modes which include carrying the uplink/downlink configuration information about a current CC in the DCI message transmitted over each CC, and carrying the uplink/downlink configuration information about the CCs aggregated at the terminal in the DCI message transmitted in a primary cell of each terminal. When the uplink/downlink configuration information about the CCs aggregated at the terminal is carried in the DCI message transmitted in the primary cell of each terminal, the transmission unit is configured to receive the uplink/downlink configuration of the transmission nodes and/or carriers for each terminal that receives the DCI message, and transmit the acquired uplink/downlink configuration information to each terminal via the DCI message.

Alternatively, a vacant bit in the DCI message is set as a pre-agreed constant value.

In still yet another aspect, the present disclosure provides in some embodiments a terminal, including: a reception unit configured to receive a DCI message from a base station, the DCI message including at least one uplink/downlink configuration information domain, at least one of the uplink/downlink configuration information domains included in the DCI message being parsed by at least one terminal, and the uplink/downlink configuration information domain being configured to carry uplink/downlink configuration information; and a parsing unit configured to parse the DCI message in accordance with predetermined DCI configuration information, and determine its own uplink/downlink configuration from the DCI message.

According to the terminal in the embodiments of the present disclosure, the base station transmits the uplink/downlink configuration information to the at least one terminal via the DCI message, so that the terminal may parse the DCI message in accordance with the predetermined DCI configuration information, and acquire its own uplink/downlink configuration from a corresponding position in the DCI message. As a result, it is able for the terminal to determine the TDD uplink/downlink configuration information.

Further, in order to enable the base station to transmit new DCI configuration information corresponding to the terminal to the terminal in time when transmission nodes of the terminal, its carrier states or its conditions supporting flexible uplink/downlink configuration have been changed, the reception unit is further configured to receive the new DCI configuration information corresponding to the terminal from the base station when the base station determines that the transmission nodes of the terminal, its carrier states or its conditions supporting flexible uplink/downlink configuration have been changed.

In order to enable the terminal to determine the position of the uplink/downlink configuration in the DCI message in a convenient manner, the DCI configuration information includes an uplink/downlink configuration information domain index value corresponding to the terminal. The uplink/downlink configuration information domain index value is configured to determine the position of the uplink/downlink configuration information related to the terminal in the DCI message. The parsing unit is configured to determine its uplink/downlink configuration from the DCI message in accordance with the uplink/downlink configuration information domain index value.

Further, the DCI message is scrambled with a CRC through a predetermined TDD-RNTI. The DCI configuration information further includes TDD-RNTI information of the DCI message corresponding to the terminal. The parsing unit is configured to parse the DCI message in accordance with the TDD-RNTI information.

Further, when there is a vacant region in the DCI message, in order to facilitate the detection by the terminal, the DCI configuration information further includes a length of a valid information domain in the DCI message, or a length of the vacant region in the DCI message. The parsing unit is configured to perform maximum likelihood detection on the DCI message in accordance with the length of the valid information domain in the DCI message or the length of the vacant region in the DCI message.

Alternatively, the uplink/downlink configuration information domain corresponds to one carrier and/or one transmission node.

In order to utilize system resources in a better manner, a length of the uplink/downlink configuration information domain is 3 bits.

Alternatively, the reception unit is configured to receive the DCI message from the base station in a PDCCH or EPDCCH common search space.

There are two transmission modes which include carrying the uplink/downlink configuration information about a current CC in the DCI message transmitted over each CC, and carrying the uplink/downlink configuration information about the CCs aggregated at the terminal in the DCI message transmitted in a primary cell of each terminal.

Alternatively, a vacant bit in the DCI message is set as a pre-agreed constant value.

In still yet another aspect, the present disclosure provides in some embodiments a base station including a processor and a data transceiver. The processor is configured to determine uplink/downlink configuration information and transmit the uplink/downlink configuration information to at least one terminal via a DCI message, so that the at least one terminal parses the DCI message in accordance with predetermined DCI configuration information and determines its own uplink/downlink configuration from the DCI message, the DCI message including at least one uplink/downlink configuration information domain, at least one of the uplink/downlink configuration information domains included in the DCI message being parsed by the at least one terminal, the uplink/downlink configuration information domain being configured to carry the uplink/downlink configuration information. The data transceiver is configured to receive and transmit data under the control of the processor.

In still yet another aspect, the present disclosure provides in some embodiments a terminal including a processor and a data transceiver. The processor is configured to receive a DCI message from a base station, the DCI message including at least one uplink/downlink configuration information domain, at least one of the uplink/downlink configuration information domains included in the DCI message being parsed by at least one terminal, and the uplink/downlink configuration information domain being configured to carry uplink/downlink configuration information. The data transceiver is configured to receive and transmit data under the control of the processor.

According to the terminal in the embodiments of the present disclosure, the base station transmits the uplink/downlink configuration information to the at least one terminal via the DCI message, so that the terminal may parse the DCI message in accordance with the predetermined DCI configuration information, and acquire its own uplink/downlink configuration from a corresponding position in the DCI message. As a result, it is able for the terminal to determine the TDD uplink/downlink configuration information.

According to the methods for indicating and determining uplink/downlink configuration, the base station and the terminal in the embodiments of the present disclosure, the base station transmits the uplink/downlink configuration information to the at least one terminal via the DCI message, the DCI message is provided with at least one uplink/downlink configuration information domain for carrying the uplink/downlink configuration information, and at least one of the uplink/downlink configuration information domains in the DCI message may be parsed by the at least one terminal. The at least one terminal parses the received DCI message in accordance with the predetermined DCI configuration information, and acquires its own uplink/downlink configuration from the corresponding position in the DCI message. As a result, it is able for the base station to indicate the TDD uplink/downlink configuration information of the terminal.

DETAILED DESCRIPTION

The present disclosure provides in some embodiments methods for indicating and determining uplink/downlink configuration, a base station and a terminal, where the base station transmits uplink/downlink configuration information to at least one terminal via a DCI message, the DCI message is provided with at least one uplink/downlink configuration information domain for carrying the uplink/downlink configuration information, and at least one of the uplink/downlink configuration information domains in the DCI message may be parsed by at least one terminal. The at least one terminal parses the received DCI message in accordance with predetermined DCI configuration information, and acquires its own uplink/downlink configuration from a corresponding position in the DCI message. As a result, it is able for the base station to indicate the TDD uplink/downlink configuration information of the terminal.

Figure 1:
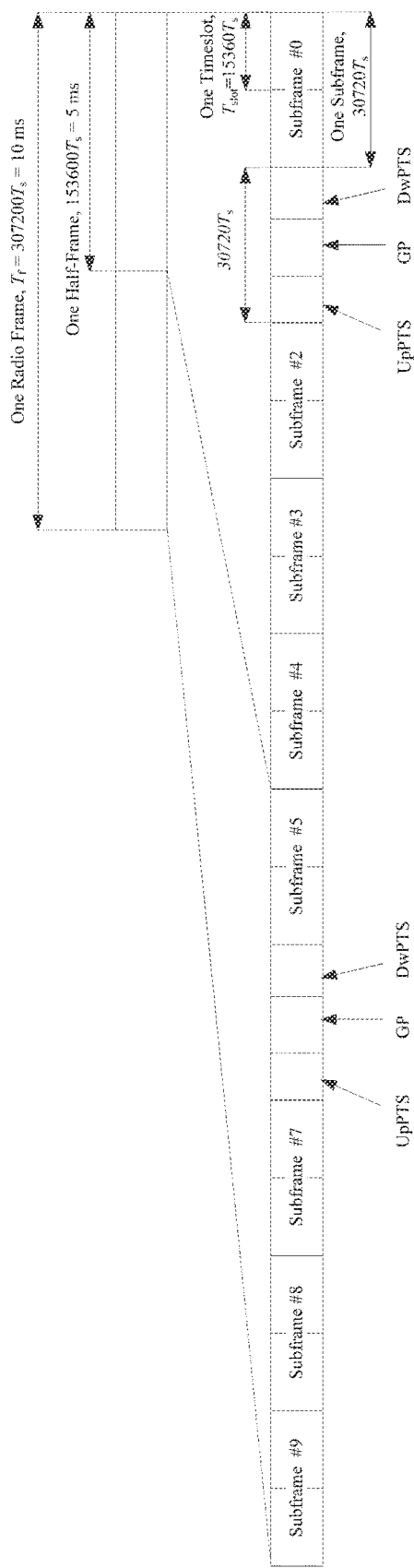
FIG. 1 is a schematic view showing a frame structure in an existing LTE TDD system.
Figure 2:
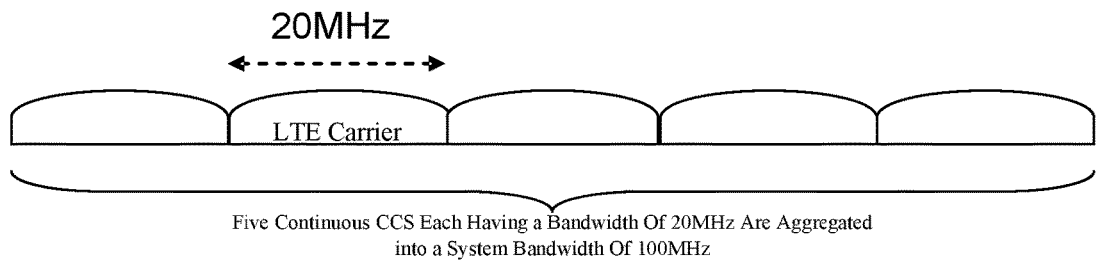
FIG. 2 is a schematic view showing the continuous carrier aggregation in the related art.
Figure 3:
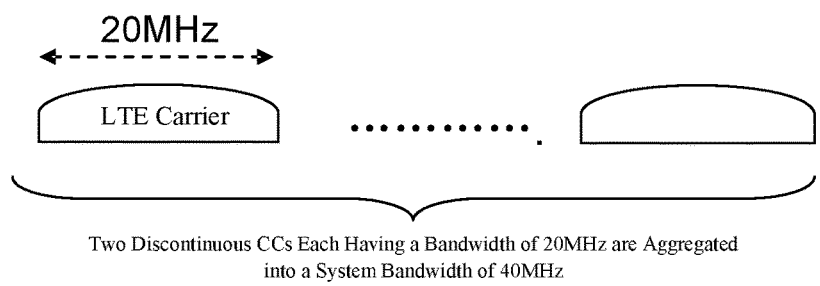
FIG. 3 is a schematic view showing the discontinuous carrier aggregation in the related art.
Figure 4A:
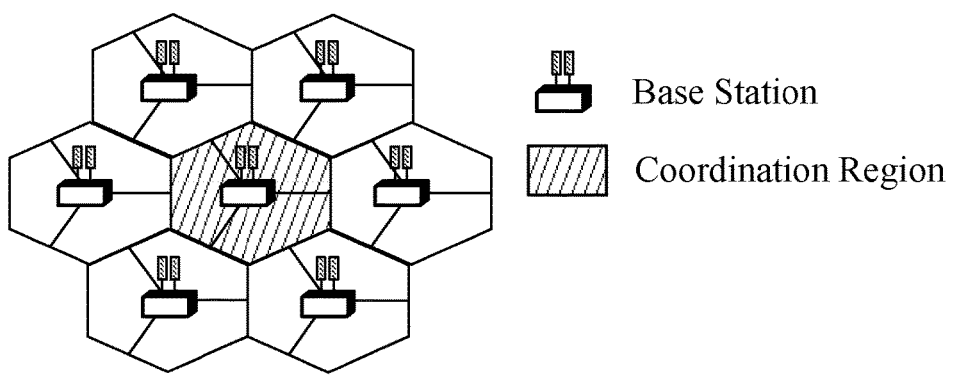
FIG. 4a is a schematic view showing a scenario for intra-site coordination in a homogenous network in the related art.
Figure 4B:
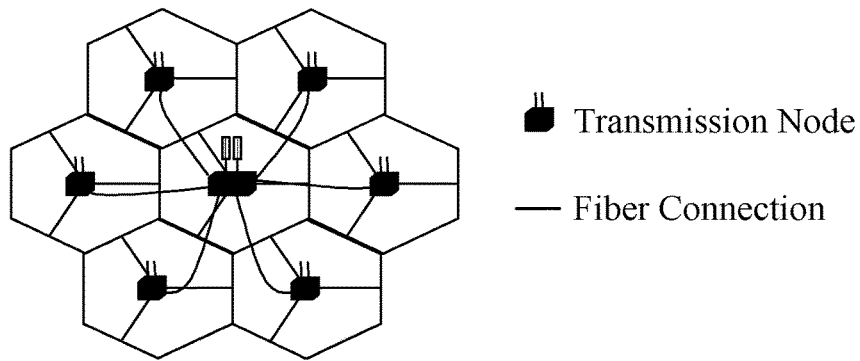
FIG. 4b is another schematic view showing a scenario for coordination of multiple transmission nodes in a homogeneous network.
Figure 4C:
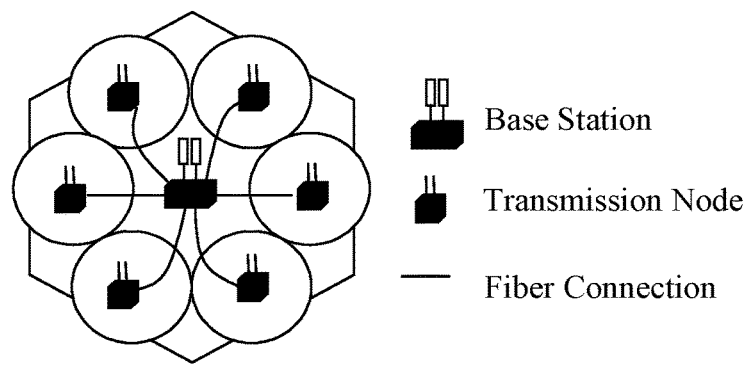
FIG. 4c is yet another schematic view showing a scenario for coordination of multiple transmission nodes in a heterogeneous network where a separate cell ID is configured for each transmission node in the related art.
Figure 4D:
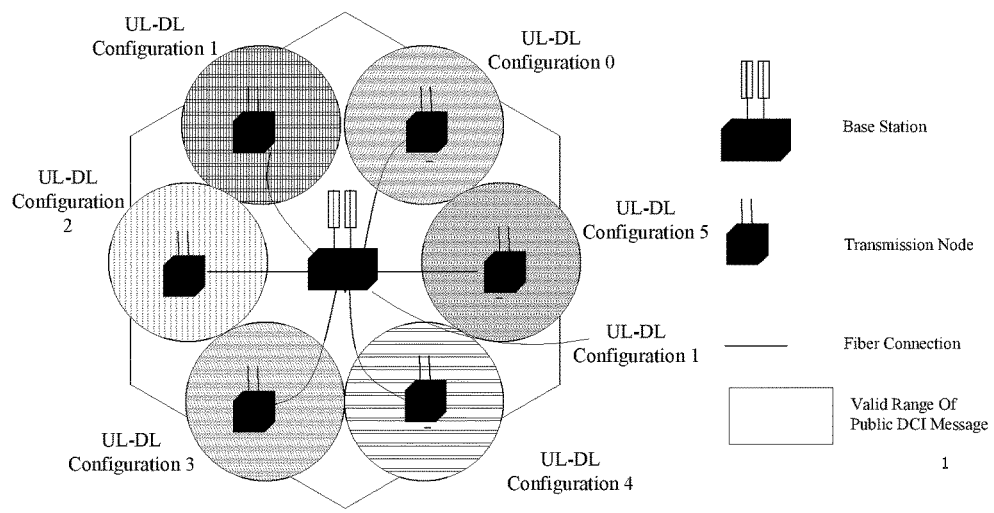
FIG. 4d is still yet another schematic view showing a scenario for coordination of multiple transmission nodes in a heterogeneous network where an identical cell ID is configured for the transmission nodes in the related art.
Figure 5:
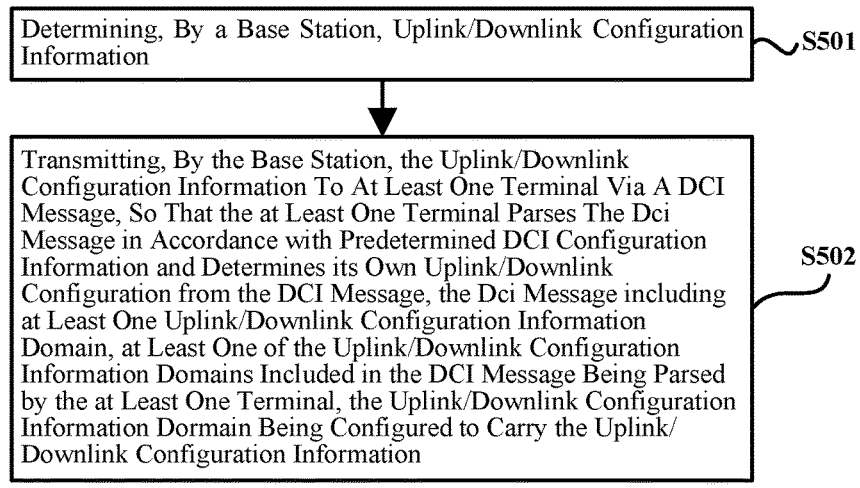
FIG. 5 is a flow chart of a method for indicating uplink/downlink configuration according to one embodiment of the present disclosure.

As shown in FIG. 5, a method for indicating uplink/downlink configuration in some embodiments of the present disclosure includes Step S501 of determining, by a base station, uplink/downlink configuration information; and Step S502 of transmitting, by the base station, the uplink/downlink configuration information to at least one terminal via a DCI message, so that the at least one terminal parses the DCI message in accordance with predetermined DCI configuration information and determines its own uplink/downlink configuration from the DCI message, the DCI message including at least one uplink/downlink configuration information domain, at least one of the uplink/downlink configuration information domains included in the DCI message being parsed by the at least one terminal, the uplink/downlink configuration information domain being configured to carry the uplink/downlink configuration information.

According to the method in the embodiments of the present disclosure, the base station transmits the uplink/downlink configuration information to the at least one terminal via the DCI message, so that the terminal may parse the DCI message in accordance with the predetermined DCI configuration information, and acquire its own uplink/downlink configuration from the DCI message. As a result, it is able for the base station to indicate the TDD uplink/downlink configuration information of the terminal.

The terminal determines its own uplink/downlink configuration from the corresponding uplink/downlink configuration information domain included in the DCI message.

Alternatively, the terminal may determine a position of the uplink/downlink configuration information related to the terminal in the DCI message in accordance with the predetermined DCI configuration information, parse the DCI message, and determine its own uplink/downlink configuration from the corresponding position in the DCI message. i.e., determine the uplink/downlink configuration information domain occupied by the uplink/downlink configuration information related to the terminal in the DCI message. Of course, the terminal may also determine the position of the uplink/downlink configuration information related to the terminal in the DCI message in accordance with an agreement.

In the embodiments of the present disclosure, at least one of the uplink/downlink configuration information domains included in the DCI message may be parsed by at least one terminal, i.e., the DCI message may include one or more uplink/downlink configuration information domains, and at least one of these uplink/downlink configuration information domains may be parsed by the at least one terminal. For example, the DCI message includes five uplink/downlink configuration information domains, and after the DCI message has been transmitted, three of these uplink/downlink configuration information domains in the DCI message may be parsed by one, three and four terminals, respectively, while the other two uplink/downlink configuration information domains may not be parsed by any terminal.

Each terminal may be provided by a system with one DCI message. In order to save system resources, each DCI message may be provided with a plurality of uplink/downlink configuration information domains, i.e., the DCI message may include two or more uplink/downlink configuration information domains. A plurality of terminals may each parse the DCI message and acquire its own uplink/downlink configuration information from the corresponding uplink/downlink configuration information domain. In order to further save the system resources, the terminals having the identical uplink/downlink configuration may parse the identical uplink/downlink configuration information domain so as to acquire their own uplink/downlink configuration information.

It can therefore be seen that, one DCI message may include two or more uplink/downlink configuration information domains, and at least one of the uplink/downlink configuration information domains may be parsed by at least one terminal or by at least two terminals. Alternatively, one DCI message may merely include one uplink/downlink configuration information domain which may be parsed by at least two terminals.

The method is performed by the base station, and the base station may be a Base Transceiver Station (BTS), a Node B, an evolved Node B (eNB), a Home Node B (HNB), a Home eNode B (HeNB), a Relay Node (RN), a wireless access point (AP), a wireless router or the like. A single antenna or multiple antennae may be adopted by the base station so as to provide wireless signal coverage for specific regions, i.e., the so-called cells. Usually, the term "cell" refers to a logic entity which is used to provide services for the terminals within the specific coverage and which includes software and hardware subsystems of the base station, and one base station may be associated with one cell. The cell may also be divided into sectors, and at this time, one base station may be associated with a plurality of sectors.

Based on its configuration, each terminal may acquire different contents from different positions of the DCI message, so the base station is required to transmit the DCI configuration information of each terminal to the terminal. After receiving the DCI message, the terminal may determine the position of the uplink/downlink configuration information related to the terminal in the DCI message in accordance with the predetermined DCI configuration information, parse the DCI message, and determine its own uplink/downlink configuration from the corresponding position in the DCI message.

When transmission nodes of the terminal, its carrier states or its conditions supporting flexible uplink/downlink configuration have been changed, the DCI configuration information of the terminal may be changed correspondingly. At this time, the base station is required to transmit new DCI configuration information corresponding to the terminal to the terminal.

Hence, the method for indicating uplink/downlink configuration in the embodiments of the present disclosure may further include transmitting, by the base station, the new DCI configuration information corresponding to the terminal to the terminal when the base station determines that the transmission nodes of the terminal, its carrier states or its conditions supporting flexible uplink/downlink configuration have been changed.

The DCI configuration information includes an uplink/downlink configuration information domain index value corresponding to the terminal. The uplink/downlink configuration information domain index value is configured to determine the position of the uplink/downlink configuration information related to the terminal in the DCI message, and the terminal determines its uplink/downlink configuration from the DCI message in accordance with the uplink/downlink configuration information domain index value.

The terminal may determine the uplink/downlink configuration information domain occupied by the uplink/downlink configuration information related to the terminal in the DCI message from the corresponding position in the DCI message in accordance with the uplink/downlink configuration information domain index value, and then determine its own uplink/downlink configuration information.

Further, the DCI message is scrambled with a CRC through a TDD-RNTI which is predetermined or pre-agreed with the corresponding terminal, and at this time, there is at least one TDD-RNTI in the system.

The DCI configuration information further includes TDD-RNTI information of the DCI message corresponding to the terminal, and the terminal parses the DCI message in accordance with the TDD-RNTI information.

When there is only one kind of DCI message in the system, it is unnecessary for the base station to notify the terminal of the TDD-RNTI information of the DCI message in the DCI configuration information. Instead, the base station directly makes an agreement with the terminal on the TDD-RNTI information via high-layer signaling or protocol. When there are many kinds of DCI messages in the system, the base station may configure the TDD-RNTI information of the DCI message for the terminal in the DCI configuration information, so as to enable the terminal to parse the corresponding DCI message in a convenient manner.

Further, when there is a vacant region in the DCI message, the DCI configuration information may further include a length of a valid information domain in the DCI message, or a length of the vacant region in the DCI message.

For example, the base station notifies the terminal of the length of the valid information domain in the DCI message, then the terminal may acquire a length of an invalid information domain by subtracting the length of the valid information domain from a DCI total length. The length of the invalid information domain is just the vacant region in the DCI message, i.e., bits in the DCI message that are not used to indicate any uplink/downlink configuration information. The bits in the invalid information domain may be set by a network as specific values, e.g., all zeros or all ones. In this way, the terminal may perform maximum likelihood detection on the DCI in accordance with a length of valid bits and priori information of invalid bits, so as to improve the detection efficiency.

According to the practical need, the DCI configuration information may include the uplink/downlink configuration information domain index value corresponding to the terminal, the TDD-RNTI information of the DCI message or the length of the valid information domain in the DCI message, or a combination thereof. Of course, the DCI configuration information may also include any other information.

When the system includes only one transmission node, each uplink/downlink configuration information domain may correspond to one carrier. When the system includes only one carrier, each uplink/downlink configuration information domain may correspond to one node. When the system includes many transmission nodes and the transmission nodes have many carriers, each uplink/downlink configuration information domain may correspond a combination of one carrier and one transmission node.

Further, according to the content of the uplink/downlink configuration, the length of the uplink/downlink configuration information domain may be set flexibly. In order to utilize the system resources in a better manner, the length may be set as a value sufficient to carry all the contents of the uplink/downlink configuration. For example, the length of each uplink/downlink configuration information domain may be 3 bits.

In the embodiments of the present disclosure, the length of the DCI message may be identical to that of any DCI message in Table 2, e.g., identical to that of DCI format 3/3A, or DCI format 1C.

To be specific, Step S502 of transmitting, by the base station, the uplink/downlink configuration information to the at least one terminal via the DCI message includes transmitting, by the base station, the uplink/downlink configuration information to the at least one terminal via the DCI message in a PDCCH or EPDCCH common search space.

Further, according to the practical need, when the uplink/downlink configuration information is transmitted via the DCI message in Step S502, there are two transmission modes which include carrying the uplink/downlink configuration information about a current CC in the DCI message transmitted over each CC, and carrying the uplink/downlink configuration information about the CCs aggregated at the terminal in the DCI message transmitted in a primary cell of each terminal, When the uplink/downlink configuration information about the CCs aggregated at the terminal is carried in the DCI message transmitted in the primary cell of each terminal, the base station is required to determine the uplink/downlink configuration information of the transmission nodes and/or carriers for each terminal, and transmit the uplink/downlink configuration to the terminal. At this time, the step of transmitting, by the base station, the uplink/downlink configuration information to the at least one terminal via the DCI message includes acquiring, by the base station, the uplink/downlink configuration of the transmission nodes and/or carriers for each terminal that receives the DCI message, and transmitting the acquired uplink/downlink configuration information to each terminal via the DCI message.

To be specific, the base station may make an agreement with the terminal on the TDD-RNTI to be monitored via high-layer signaling or protocol, or when there is a plurality of TDD-RNTIs in the system, the base station may notify each terminal of the TDD-RNTIs to be monitored by each terminal. Different terminals may use an identical TDD-RNTI or different TDD-RNTIs to decode PDCCH, so as to obtain the DCI message.

A vacant bit in the DCI message may be set as a pre-agreed constant value, and the terminal may perform the maximum likelihood detection on the DCI message in accordance with the constant value and the length of the vacant region, so as to improve the detection efficiency.

The configuration methods for the uplink/downlink configuration will be described hereinafter, and in the following embodiments, the terminal may also be called as "user equipment (UE)".

First Embodiment

Figure 6A:
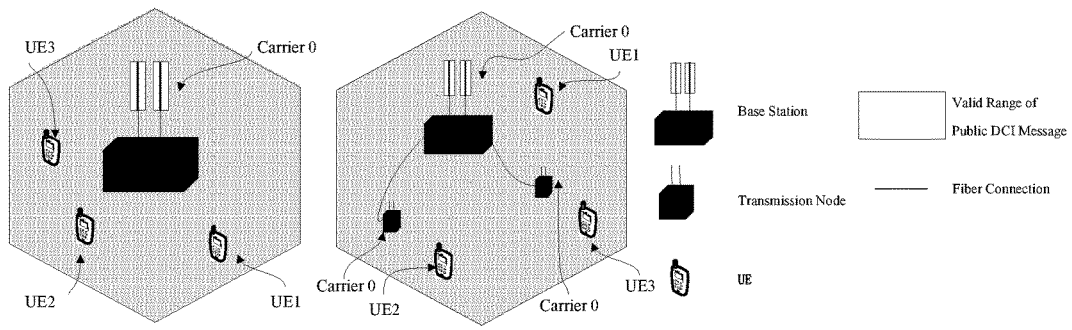
FIG. 6a is a schematic view showing a scenario according to the first embodiment of the present disclosure.

As shown in FIG. 6a, there is only one CC in the network, and each cell includes only one transmission node, or a TDD subframe has identical configuration in the case of many transmission nodes. Different patterns in FIG. 6a represent different valid ranges of the uplink/downlink configuration.

Figure 6B:
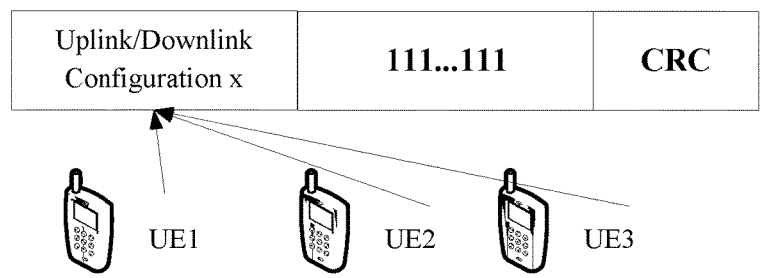
FIG. 6b is a schematic view showing a DCI message according to the first embodiment of the present disclosure.

In this scenario, merely one DCI message for indicating the uplink/downlink configuration may be provided, and the DCI message merely includes one piece of uplink/downlink configuration information, as shown in FIG. 6b. The terminal acquires the TDD-RNTI in accordance with the agreed protocol or a notification from the network, so as to decode the DCI message. Then, it determines the uplink/downlink configuration information index value (1) in accordance with the notification from the network, and parses the uplink/downlink configuration. Optimally, the terminal may acquire the number of the valid or invalid bits in the DCI message in accordance with the notification from the network, and perform the maximum likelihood detection on the DCI message in accordance with the number of the valid or invalid bits, so as to improve the detection efficiency.

Second Embodiment

Figure 7A:
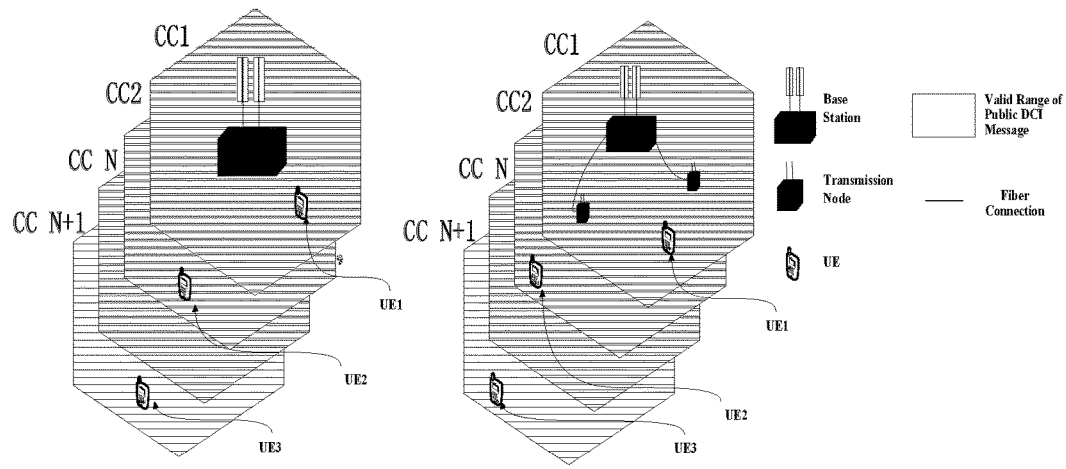
FIG. 7a is another schematic view showing a scenario according to the second embodiment of the present disclosure.

As shown in FIG. 7a, a plurality of carriers is deployed within the network, and each cell includes only one transmission node, or the TDD subframe has identical configuration in the case of many transmission nodes. Different patterns in FIG. 7a represent different valid ranges of the uplink/downlink configuration.

Figure 7B:
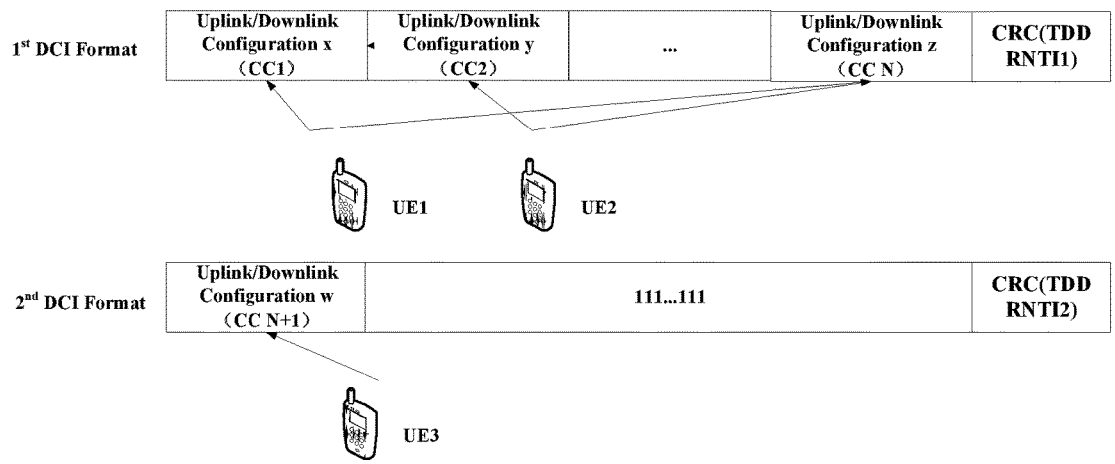
FIGS. 7b and 7c are schematic views showing the DCI message according to the second embodiment of the present disclosure.

When there are N carriers in the scenario, and a UE operates at a carrier-aggregation mode and merely reads Common Search Space (CSS) of Primary cell (Pcell), the base station is required to transmit one or more DCI messages in the CSS in the CCs of the Pcell for the UE. Each DCI message includes one or more uplink/downlink configuration information domains for indicating the uplink/downlink configuration information over each CC. When a plurality of DCI messages is transmitted by the network in one CC, it is required to notify the terminal of the TDD-RNTI for scrambling. As shown in FIG. 7b, there are N+1 CCs in the network, CC1 and CC N are aggregated by UE1, and CC1 serves as Pcell; CC2 and CC N are aggregated by UE2, and CC2 serves as Pcell; and UE3 merely operates at CC N+1. In addition, one DCI message merely carries the information of 3*N bits.

The base station notifies UE1 of the uplink/downlink configuration information domain index values corresponding to CC1 and CCN in the DCI message, and notifies UE1 of TDD-RNTI1 scrambled with a CRC used by the DCI format; notifies UE2 of the uplink/downlink configuration information domain index values corresponding to CC2 and CCN in the DCI message, and notifies UE2 of TDD-RNTI1 scrambled with the CRC used by the DCI format; and notifies UE3 of the uplink/downlink configuration information domain index values corresponding to CC N+1 in the DCI message and notifies UE3 of TDD-RNTI2 scrambled with a CRC used by another DCI format. When indicating the uplink/downlink configuration, the base station transmits a $1^{st}$ DCI format (a first DCI message) in FIG. 7b over CSS of CC1, transmits the $1^{st}$ DCI format over CSS of CC2, and transmit a $2^{nd}$ DCI format over CSS of CC N+1. After receiving the DCI message, the UE may acquire its own uplink/downlink configuration information from the DCI message.

Figure 7C:
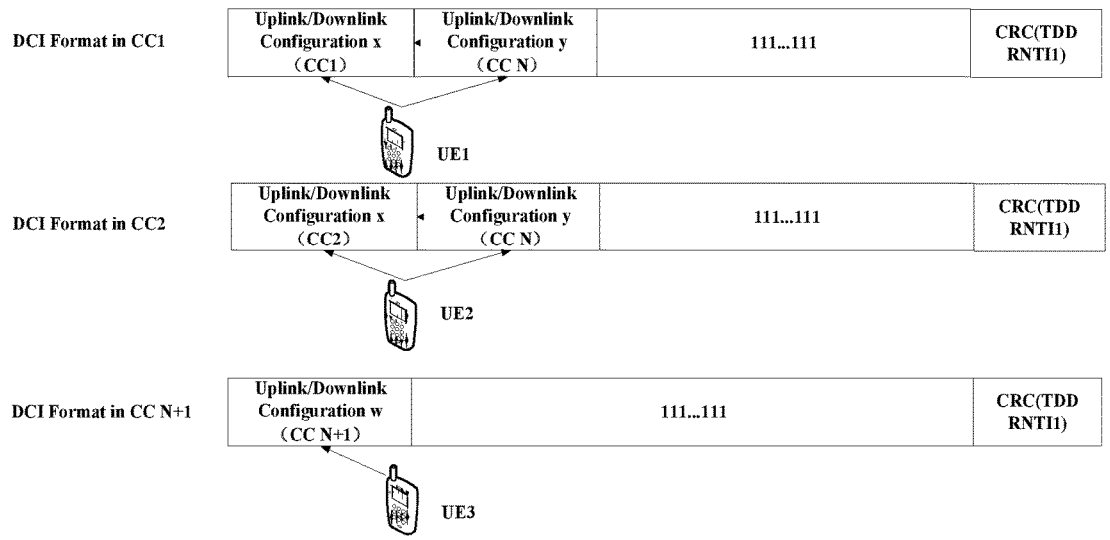

When each CC serves as PCell and transmits the DCI message carrying the uplink/downlink configuration information over CSS, each CC may adopt an identical information format, and the uplink/downlink configuration over all the CCs may be transmitted sequentially, as shown in FIG. 7b. Also, each CC may adopt a separate information format, and merely the uplink/downlink configuration over the CC configured for the UE where the CC serves as the PCell is indicated in the DCI message, as shown in FIG. 7c. For example, in the above scenario, CC1 merely serves as Pcell of UE1, so one DCI format including the uplink/downlink configuration is merely transmitted over CC1, and the DCI format merely carries the uplink/downlink configuration information over CC1 and CCN. CC2 merely serves as Pcell of UE2, so one DCI format including the uplink/downlink configuration is merely transmitted over CC2, and the DCI format merely carries the uplink/downlink configuration information over CC2 and CCN. CCN+1 merely serves as Pcell of UE3 and UE3 merely operates at CCN+1, so one DCI format including the uplink/downlink configuration is merely transmitted over CCN+1, and the DCI format merely carries the uplink/downlink configuration information over CCN+1.

It should be appreciated that, here, the system including a plurality of TDD-RNTIs is taken as an example. Of course, the system may also include only one TDD-RNTI, i.e., one DCI format is transmitted by the network over each carrier. At this time, the used TDD-RNTI is unnecessary to be notified by the network; instead, it may be acquired in accordance with the agreed protocol. However, at this time, the number of the CCs which may be indicated by the DCI format and for which the uplink/downlink configuration is configured separately is limited by the total length of the DCI format. For example, when the DCI message has a length of 15 bits and each uplink/downlink configuration information domain is 3 bits, at most five CCs for which the uplink/downlink configuration is configured separately may be indicated.

Further, the valid bits may be transmitted to the UE via high-layer signaling, and the UE may perform the maximum likelihood detection in accordance with the valid bits, so as to improve the detection efficiency.

Third Embodiment

Figure 8A:
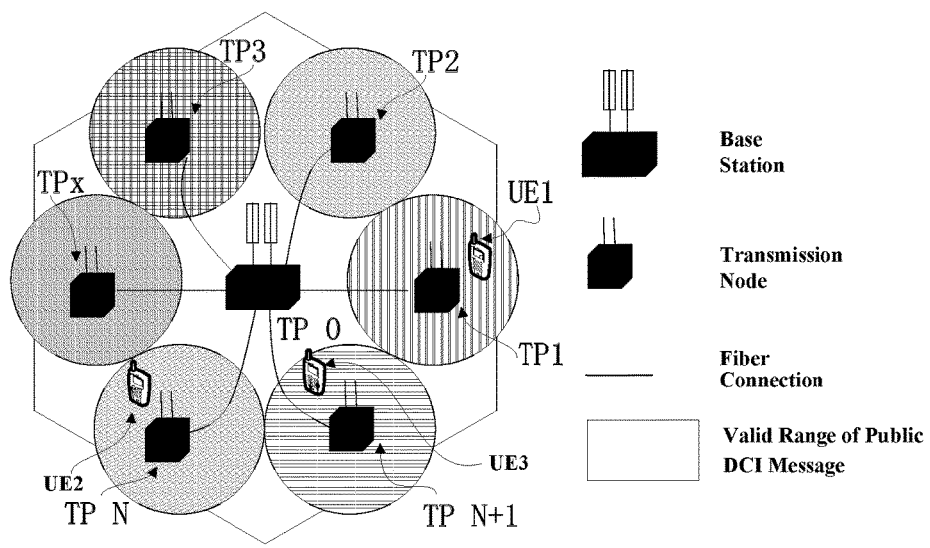
FIG. 8a is yet another schematic view showing a scenario according to the third embodiment of the present disclosure.

As shown in FIG. 8a, merely one carrier is used in the network, each cell includes a plurality of transmission nodes, and the uplink/downlink configuration is separately configured for each transmission node. Different patterns in FIG. 8a represent different valid ranges of the uplink/downlink configuration.

Figure 8B:
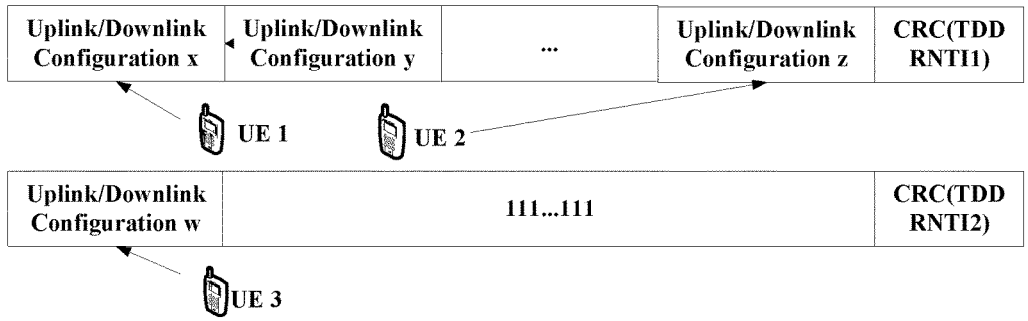
FIG. 8b is yet another schematic view showing the DCI message according to the third embodiment of the present disclosure.

In this scenario, the base station is required to transmit one or more DCI messages in CSS, each DCI message includes a plurality of uplink/downlink configuration information domains, and each uplink/downlink configuration information domain corresponds to one transmission node. As shown in FIG. 8b, UE1 is served by a transmission node 1, and the base station notifies UE1 in advance of TDD-RNTI1 and an uplink/downlink configuration information domain index value 1 corresponding to the transmission node 1. Based on them, UE1 detects the DCI message, and acquires the uplink/downlink configuration of the transmission node 1. UE2 is served by a transmission node N, and the base station notifies UE2 in advance of TDD-RNTI1 and an uplink/downlink configuration information domain index value N. Based on them, UE2 detects the DCI message and acquires the uplink/downlink configuration of the transmission node N. UE3 is served by a transmission node N+1, and the base station notifies UE3 in advance of TDD-RNTI2 and the uplink/downlink configuration information domain index value 1 corresponding to the transmission node N+1. Based on them, UE3 detects the DCI message and acquires the uplink/downlink configuration of the transmission node N+1.

It should be appreciated that, here, the system including a plurality of TDD-RNTIs is taken as an example. Of course, the system may also include only one TDD-RNTI, i.e., one DCI format is transmitted by the network over each carrier.

At this time, the used TDD-RNTI is unnecessary to be notified by the network; instead, it may be acquired in accordance with the agreed protocol. However, at this time, the number of the transmission nodes which may be indicated separately and for which the uplink/downlink configuration is configured separately is limited by the total length of the DCI format. For example, when the DCI message has a length of 15 bits and each uplink/downlink configuration information domain is 3 bits, at most five transmission nodes for which the uplink/downlink configuration is configured separately may be indicated.

Further, the valid bits may be transmitted to the UE via high-layer signaling, and the UE may perform the maximum likelihood detection in accordance with the valid bits, so as to improve the detection efficiency.

Fourth Embodiment

Figure 9A:
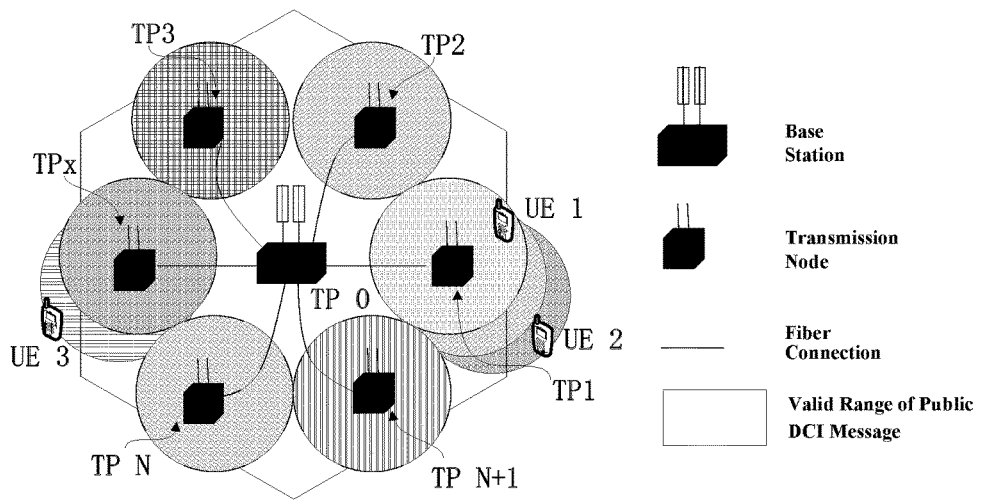
FIG. 9a is still yet another schematic view showing a scenario according to the fourth embodiment of the present disclosure.

As shown in FIG. 9a, a plurality of carriers is used in the network, each carrier includes a plurality of transmission nodes, and the uplink/downlink configuration may be separately configured for each transmission node. Different patterns in FIG. 9a represent different valid ranges of the uplink/downlink configuration.

In this scenario, the DCI message transmitted by the base station includes a plurality of uplink/downlink configuration information domains indicating the uplink/downlink configuration. Each uplink/downlink configuration information domain corresponds to a combination of one CC and one transmission node. The base station transmits the DCI message over CSS of a CC, so that the terminal where the CC serves as PCell acquires its uplink/downlink configuration over each CC and the transmission node by which the terminal is served.

Figure 9B:
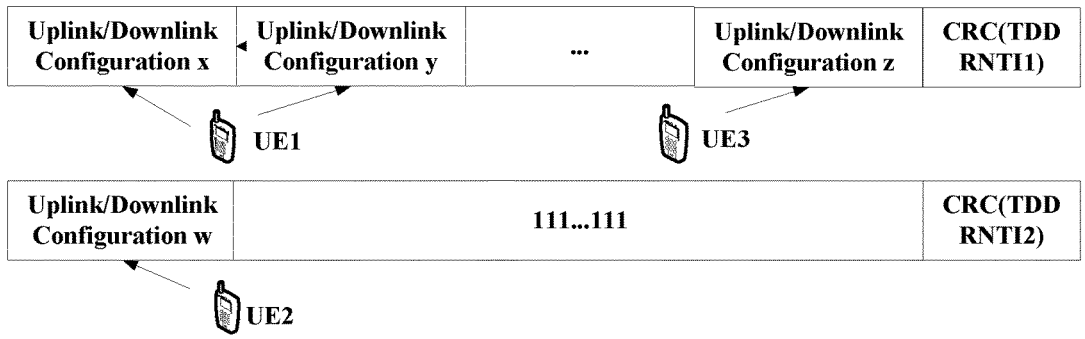
FIG. 9b is still yet another schematic view showing the DCI message according to the fourth embodiment of the present disclosure.

As shown in FIG. 9b, UE1 is served by the transmission node 1, a carrier 1 and a carrier 2 are aggregated by UE1, and CC1 serves as Pcell. The base station transmits the DCI message over CSS of CC1, and notifies UE1 in advance of TDD-RNTI1 corresponding to the DCI message, an uplink/downlink configuration information domain index value corresponding to the transmission node 1 and CC1, and an uplink/downlink configuration information domain index value corresponding to the transmission node 1 and CC2. UE1 detects CSS over the Pcell, i.e., CC1, and acquires the uplink/downlink configuration information corresponding to the transmission node 1 over each carrier UE2 is served by the transmission node 1 and merely operates at a carrier N+1. The base station transmits the DCI message over CSS of CC1, and notifies UE2 in advance of TDD-RNTI2 corresponding to the DCI message and an uplink/downlink configuration information domain index value corresponding to the transmission node 1 and CC N+1. UE2 detects CSS over CC1, and acquires the uplink/downlink configuration information corresponding to the transmission node 1. UE3 is served by a transmission node X and merely operates at the carrier 1. The base station transmits the DCI message over CSS of CC1, and notifies UE3 in advance of TDD-RNTI1 corresponding to the DCI message and an uplink/downlink configuration information domain index value corresponding to the transmission node X and CC1. UE3 detects CSS over CC1 and acquires the uplink/downlink configuration corresponding to the transmission node X.

It should be appreciated that, here, the system including a plurality of TDD-RNTIs is taken as an example. Of course, the system may also include only one TDD-RNTI, i.e., one DCI format is transmitted by the network over each carrier. At this time, the used TDD-RNTI is unnecessary to be notified by the network; instead, it may be acquired in accordance with the agreed protocol. However, at this time, the number of the CCs and the transmission nodes which may be indicated by the DCI format and for which the uplink/downlink configuration is configured separately is limited by the total length of the DCI format. For example, when the DCI message has a length of 24 bits and each uplink/downlink configuration information domain is 3 bits, it may support two CCs for which the uplink/downlink configuration is configured separately, and each carrier may be used for four transmission nodes for which the uplink/downlink configuration is configured separately; or it may support four CCs for which the uplink/downlink configuration is configured separately, and each carrier may be used for two transmission nodes for which the uplink/downlink configuration is configured separately.

Further, the valid bits may be transmitted to the UE via high-layer signaling, and the UE may perform the maximum likelihood detection in accordance with the valid bits, so as to improve the detection efficiency.

In the above embodiment, optimally, a plurality of UEs may be configured as reading the identical uplink/downlink configuration information domain in accordance with the CCs aggregated by each UE and the transmission nodes by which the UEs are served. For example, an identical TDD-RNTI1 and/or uplink/downlink configuration information domain index value may be configured by the network for the UEs that use an identical CC and/or transmission node.

Figure 10:
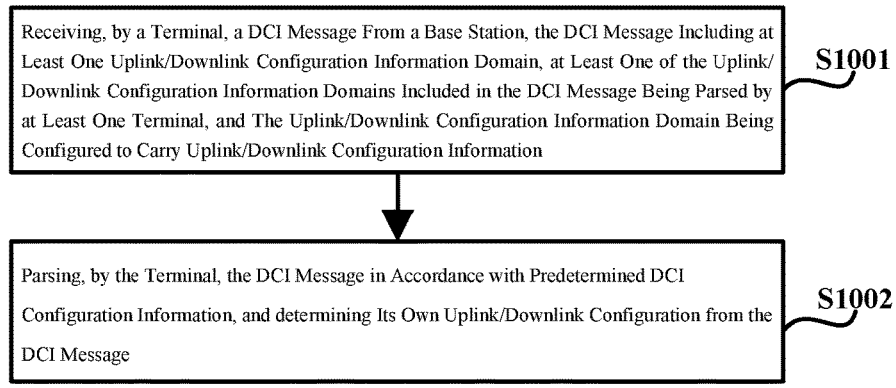
FIG. 10 is a flow chart of a method for determining uplink/downlink configuration according to one embodiment of the present disclosure.

As shown in FIG. 10, the present disclosure further provides in some embodiments a method for determining uplink/downlink configuration, which includes: Step S1001 of receiving, by a terminal, a DCI message from a base station, the DCI message including at least one uplink/downlink configuration information domain, at least one of the uplink/downlink configuration information domains included in the DCI message being parsed by at least one terminal, and the uplink/downlink configuration information domain being configured to carry uplink/downlink configuration information, and Step S1002 of parsing, by the terminal, the DCI message in accordance with predetermined DCI configuration information, and determining its own uplink/downlink configuration from the DCI message.

The method is performed by the terminal, and in some embodiments, the terminal may be a mobile phone, a flat-panel computer, a laptop computer, a data card, a netbook, a smart watch, a MiFi, and a product having a wireless communication function, such as a digital camera, a smart electric meter or a household appliance. The terminal may be in wireless communication with different base stations using one or more wireless access technologies.

The terminal determines its own uplink/downlink configuration from the corresponding uplink/downlink configuration information domain in the DCI message.

Alternatively, the terminal may determine a position of the uplink/downlink configuration information related to the terminal in the DCI message in accordance with the predetermined DCI configuration information, parse the DCI message, and determine its own uplink/downlink configuration from a corresponding position in the DCI message, i.e., determine the uplink/downlink configuration information domain occupied by the uplink/downlink configuration information related to the terminal in the DCI message. Of course, the terminal may also determine the position of the uplink/downlink configuration information related to the terminal in the DCI message in accordance with an agreement.

When transmission nodes of the terminal, its carrier states or its conditions supporting flexible uplink/downlink configuration have been changed, the DCI configuration information of the terminal may be changed correspondingly. At this time, the base station is required to transmit new DCI configuration information corresponding to the terminal to the terminal. The method further includes receiving, by the terminal, the new DCI configuration information corresponding to the terminal from the base station when the base station determines that the transmission nodes of the terminal, its carrier states or its conditions supporting flexible uplink/downlink configuration have been changed.

The DCI configuration information includes an uplink/downlink configuration information domain index value corresponding to the terminal. The uplink/downlink configuration information domain index value is configured to determine the position of the uplink/downlink configuration information related to the terminal in the DCI message, i.e., determine the uplink/downlink configuration information domain occupied by the uplink/downlink configuration information related to the terminal in the DCI message. Step S1002 of determining, by the terminal, its own uplink/downlink configuration from the DCI message in accordance with the predetermined DCI configuration information includes determining, by the terminal, its uplink/downlink configuration from the DCI message in accordance with the uplink/downlink configuration information domain index value.

Further, the DCI message is scrambled with a CRC through a predetermined TDD-RNTI. The DCI configuration information further includes TDD-RNTI information of the DCI message corresponding to the terminal. The step of parsing, by the terminal, the DCI message in accordance with the predetermined DCI configuration information includes parsing, by the terminal, the DCI message in accordance with the TDD-RNTI information.

Alternatively, the DCI configuration information further includes a length of a valid information domain in the DCI message, or a length of the vacant region in the DCI message. The step of parsing, by the terminal, the DCI message in accordance with the predetermined DCI configuration information includes performing, by the terminal, maximum likelihood detection on the DCI message in accordance with the length of the valid information domain in the DCI message or the length of the vacant region in the DCI message.

Alternatively, one uplink/downlink configuration information domain may correspond to one carry and/or one transmission node.

In order to save the system resources, the length of the uplink/downlink configuration information domain is 3 bits.

To be specific, the step of receiving, by the terminal, the DCI message from the base station includes receiving, by the terminal, the DCI message from the base station in a PDCCH or EPDCCH common search space.

According to the practical need, there are two transmission modes which include carrying the uplink/downlink configuration information about a current CC in the DCI message transmitted over each CC, and carrying the uplink/downlink configuration information about the CCs aggregated at the terminal in the DCI message transmitted in a primary cell of each terminal.

Further, a vacant bit in the DCI message is set as a pre-agreed constant value.

Figure 11:
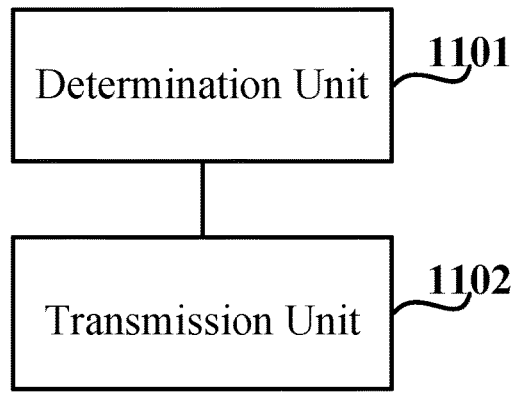
FIG. 11 is a schematic view showing a base station according to one embodiment of the present disclosure.

The present disclosure further provides in some embodiments a base station which, as shown in FIG. 11, includes a determination unit 1101 configured to determine uplink/downlink configuration information; and a transmission unit 1102 configured to transmit the uplink/downlink configuration information to at least one terminal via a DCI message, so that the at least one terminal parses the DCI message in accordance with predetermined DCI configuration information and determines its own uplink/downlink configuration from the DCI message, the DCI message including at least one uplink/downlink configuration information domain, at least one of the uplink/downlink configuration information domains included in the DCI message being parsed by the at least one terminal, the uplink/downlink configuration information domain being configured to carry the uplink/downlink configuration information.

The transmission unit 1102 is further configured to transmit new DCI configuration information corresponding to the terminal to the terminal when the base station determines that transmission nodes of the terminal, its carrier states or its conditions supporting flexible uplink/downlink configuration have been changed.

The DCI configuration information includes an uplink/downlink configuration information domain index value corresponding to the terminal. The uplink/downlink configuration information domain index value is configured to determine the position of the uplink/downlink configuration information associated with the terminal in the DCI message, and the terminal determines its uplink/downlink configuration from the DCI message in accordance with the uplink/downlink configuration information domain index value.

Further, the DCI message is scrambled with a CRC through a predetermined TDD-RNTI. The DCI configuration information further includes TDD-RNTI information of the DCI message corresponding to the terminal, and the terminal parses the DCI message in accordance with the TDD-RNTI information.

The DCI configuration information further includes a length of a valid information domain in the DCI message, or a length of the vacant region in the DCI message. Each uplink/downlink configuration information domain corresponds to one carrier and/or one transmission node, and each uplink/downlink configuration information domain has a length of 3 bits.

To be specific, the transmission unit 1102 is configured to transmit the uplink/downlink configuration information to the at least one terminal via the DCI message in a PDCCH or EPDCCH common search space.

According to the practical need, there are two transmission modes which include carrying the uplink/downlink configuration information about a current CC in the DCI message transmitted over each CC, and carrying the uplink/downlink configuration information about the CCs aggregated at the terminal in the DCI message transmitted in a primary cell of each terminal.

When the uplink/downlink configuration information about the CCs aggregated at the terminal is carried in the DCI message transmitted in the primary cell of each terminal, the transmission unit is configured to receive the uplink/downlink configuration of the transmission nodes and/or carriers for each terminal that receives the DCI message, and transmit the acquired uplink/downlink configuration information to each terminal via the DCI message.

Alternatively, a vacant bit in the DCI message is set as a pre-agreed constant value.

Figure 12:
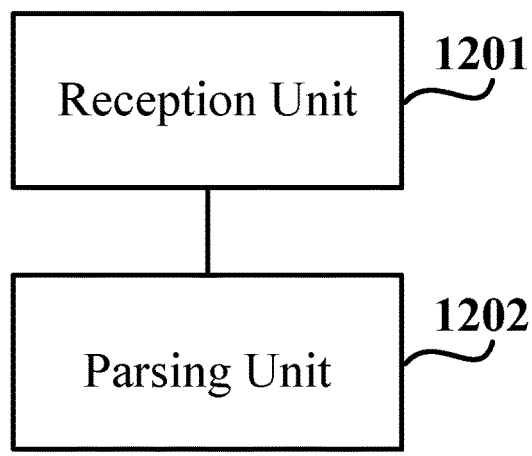
FIG. 12 is a schematic view showing a terminal according to one embodiment of the present disclosure.

The present disclosure further provides in some embodiments a terminal which, as shown in FIG. 12, includes: a reception unit 1021 configured to receive a DCI message from a base station, the DCI message including at least one uplink/downlink configuration information domain, at least one of the uplink/downlink configuration information domains included in the DCI message being parsed by at least one terminal, and the uplink/downlink configuration information domain being configured to carry uplink/downlink configuration information; and a parsing unit 1202 configured to parse the DCI message in accordance with predetermined DCI configuration information, and determine its own uplink/downlink configuration from the DCI message.

The reception unit 1201 is further configured to receive the new DCI configuration information corresponding to the terminal from the base station when the base station determines that transmission nodes of the terminal, its carrier states or its conditions supporting flexible uplink/downlink configuration have been changed.

To be specific, the DCI configuration information includes an uplink/downlink configuration information domain index value corresponding to the terminal. The uplink/downlink configuration information domain index value is configured to determine the position of the uplink/downlink configuration information associated with the terminal in the DCI message. At this time, the parsing unit is configured to determine its uplink/downlink configuration from the DCI message in accordance with the uplink/downlink configuration information domain index value.

Further, the DCI message is scrambled with a CRC through a predetermined TDD-RNTI. The DCI configuration information further includes TDD-RNTI information of the DCI message corresponding to the terminal. The parsing unit is configured to parse the DCI message in accordance with the TDD-RNTI information.

The DCI configuration information may further include a length of a valid information domain in the DCI message, or a length of the vacant region in the DCI message. The parsing unit is configured to perform maximum likelihood detection on the DCI message in accordance with the length of the valid information domain in the DCI message or the length of the vacant region in the DCI message.

Each uplink/downlink configuration information domain corresponds to one carrier and/or one transmission node, and each uplink/downlink configuration information domain has a length of 3 bits.

The reception unit 1202 may be configured to receive the DCI message from the base station in a PDCCH or EPDCCH common search space.

According to the practical needs, there are two transmission modes which include carrying the uplink/downlink configuration information about a current CC in the DCI message transmitted over each CC, and carrying the uplink/downlink configuration information about the CCs aggregated at the terminal in the DCI message transmitted in a primary cell of each terminal.

Alternatively, a vacant bit in the DCI message is set as a constant value.

The present disclosure further provides in some embodiments a base station including a processor and a data transceiver. The processor is configured to determine uplink/downlink configuration information and transmit the uplink/downlink configuration information to at least one terminal via a DCI message, so that the at least one terminal parses the DCI message in accordance with predetermined DCI configuration information and determines its own uplink/downlink configuration from the DCI message, the DCI message including at least one uplink/downlink configuration information domain, at least one of the uplink/downlink configuration information domains included in the DCI message being parsed by the at least one terminal, the uplink/downlink configuration information domain being configured to carry the uplink/downlink configuration information. The data transceiver is configured to receive and transmit data under the control of the processor.

The base station may be further configured to achieve the other functions mentioned in the above method for indicating uplink/downlink configuration. The base station may transmit the DCI message and the other information via a transceiver module and a wireless interface.

The present disclosure further provides in some embodiments a terminal including a processor and a data transceiver. The processor is configured to receive a DCI message from a base station, the DCI message including at least one uplink/downlink configuration information domain, at least one of the uplink/downlink configuration information domains included in the DCI message being parsed by at least one terminal, and the uplink/downlink configuration information domain being configured to carry uplink/downlink configuration information. The data transceiver is configured to receive and transmit data under the control of the processor.

The terminal may be further configured to achieve the other functions mentioned in the above method for determining uplink/downlink configuration.

The terminal may receive the DCI message and the other information via a transceiver module and a wireless interface.

According to the methods for indicating and determining uplink/downlink configuration, the base station and the terminal in the embodiments of the present disclosure, the base station transmits the uplink/downlink configuration information to the at least one terminal via the DCI message, the DCI message is provided with at least one uplink/downlink configuration information domain for carrying the uplink/downlink configuration information, and at least one of the uplink/downlink configuration information domains in the DCI message may be parsed by at least one terminal. The at least one terminal parses the received DCI message in accordance with the predetermined DCI configuration information, and acquires its own uplink/downlink configuration from the corresponding position in the DCI message. As a result, it is able for the base station to indicate the TDD uplink/downlink configuration information for the terminal.

It should be appreciated that, the present disclosure may be provided as a method, a system or a computer program product, so the present disclosure may be in the form of full hardware embodiments, full software embodiments, or combinations thereof. In addition, the present disclosure may be in the form of a computer program product implemented on one or more computer-readable storage mediums (including but not limited to disk memory, CD-ROM and optical memory) including computer-readable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or any other programmable data processing devices to create a machine, so that instructions executable by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

Although the preferred embodiments are described above, a person skilled in the art may make modifications and alterations to these embodiments in accordance with the basic concept of the present disclosure. So, the attached claims are intended to include the preferred embodiments and all of the modifications and alterations that fall within the scope of the present disclosure.

The above are merely the preferred embodiments of the present disclosure. A person skilled in the art may make further modifications and improvements without departing from the spirit of the present disclosure, and these modifications and improvements shall also fall within the scope of the present disclosure.

What is claimed is:

1. A method for indicating uplink/downlink configuration, comprising steps of:
    determining, by a base station, uplink/downlink configuration information; and
    transmitting, by the base station, the uplink/downlink configuration information to at least one terminal via a Downlink Control Indicator (DCI) message, so that the at least one terminal parses the DCI message in accordance with predetermined DCI configuration information and determines its own uplink/downlink configuration from the DCI message, the DCI message comprising at least one uplink/downlink configuration information domain, at least one of the uplink/downlink configuration information domains in the DCI message being parsed by the at least one terminal, the uplink/downlink configuration information domain being configured to carry the uplink/downlink configuration information,
    wherein the DCI configuration information further comprises a length of a valid information domain in the DCI message, or a length of a vacant region in the DCI message.

2. The method according to claim 1, wherein the DCI configuration information comprises an uplink/downlink configuration information domain index value corresponding to the terminal,
    the uplink/downlink configuration information domain index value is configured to determine a position of the uplink/downlink configuration information related to the terminal in the DCI message, and the terminal determines its uplink/downlink configuration from the DCI message in accordance with the uplink/downlink configuration information domain index value.

3. The method according to claim 1, wherein the DCI message is scrambled with a Cyclic Redundancy Check (CRC) through a predetermined Time Division Duplexing (TDD)-Radio Network Temporary Identifier (RNTI), the DCI configuration information further comprises TDD-RNTI information of the DCI message corresponding to the terminal, and the terminal parses the DCI message in accordance with the TDD-RNTI information.

4. The method according to claim 1, wherein the uplink/downlink configuration information domain corresponds to one carrier and/or one transmission node.

5. The method according to claim 1, wherein a length of the uplink/downlink configuration information domain is 3 bits.

6. The method according to claim 1, wherein the step of transmitting, by the base station, the uplink/downlink configuration information to the at least one terminal via the DCI message comprises:
    transmitting, by the base station, the uplink/downlink configuration information to the at least one terminal via the DCI message in a Physical Downlink Control Channel (PDCCH) or Enhanced Physical Downlink Control Channel (EPDCCH) common search space.

7. The method according to claim 1, wherein the uplink/downlink configuration information about a current Component Carrier (CC) is carried in the DCI message transmitted over each CC, or the uplink/downlink configuration information about the CCs aggregated at the terminal is carried in the DCI message transmitted in a primary cell of each terminal.

8. The method according to claim 7, wherein when the uplink/downlink configuration information about the CCs aggregated at the terminal is carried in the DCI message transmitted in the primary cell of each terminal, the step of transmitting, by the base station, the uplink/downlink configuration information to the at least one terminal via the DCI message comprises:
    acquiring, by the base station, the uplink/downlink configuration of the transmission nodes and/or carriers for each terminal that receives the DCI message, and
    transmitting the acquired uplink/downlink configuration information to each terminal via the DCI message.

9. The method according to claim 1, wherein bits in the DCI message that are not used to indicate any uplink/downlink configuration information are set as a pre-agreed constant value.

10. A method for determining uplink/downlink configuration, comprising steps of:
    receiving, by a terminal, a Downlink Control Indicator (DCI) message from a base station, the DCI message comprising at least one uplink/downlink configuration information domain, at least one of the uplink/downlink configuration information domains in the DCI message being parsed by at least one terminal, and the uplink/downlink configuration information domain being configured to carry uplink/downlink configuration information; and
    parsing, by the terminal, the DCI message in accordance with predetermined DCI configuration information, and determining its own uplink/downlink configuration from the DCI message,
    wherein the DCI configuration information further comprises a length of a valid information domain in the DCI message, or a length of a vacant region in the DCI message.

11. The method according to claim 10, wherein the DCI configuration information comprises an uplink/downlink configuration information domain index value corresponding to the terminal;
the uplink/downlink configuration information domain index value is configured to determine a position of the uplink/downlink configuration information related to the terminal in the DCI message; and
the step of determining, by the terminal, its own uplink/downlink configuration from the DCI message in accordance with the predetermined DCI configuration information comprises determining, by the terminal, its uplink/downlink configuration from the DCI message in accordance with the uplink/downlink configuration information domain index value.

12. The method according to claim 10, wherein the DCI message is scrambled with a Cyclic Redundancy Check (CRC) through a predetermined Time Division Duplexing (TDD)-Radio Network Temporary Identifier (RNTI);
the DCI configuration information further comprises TDD-RNTI information of the DCI message corresponding to the terminal; and
the step of parsing, by the terminal, the DCI message in accordance with the predetermined DCI configuration information comprises parsing, by the terminal, the DCI message in accordance with the TDD-RNTI information.

13. The method according to claim 10, wherein
the step of parsing, by the terminal, the DCI message in accordance with the predetermined DCI configuration information comprises performing, by the terminal, maximum likelihood detection on the DCI message in accordance with the length of the valid information domain in the DCI message or the length of the vacant region in the DCI message.

14. The method according to claim 10, wherein the uplink/downlink configuration information domain corresponds to one carrier and/or one transmission node.

15. The method according to claim 10, wherein a length of the uplink/downlink configuration information domain is 3 bits.

16. The method according to claim 10, wherein the step of receiving, by the terminal, the DCI message from the base station comprises receiving, by the terminal, the DCI message from the base station in a Physical Downlink Control Channel (PDCCH) or Enhanced Physical Downlink Control Channel (EPDCCH) common search space.

17. The method according to claim 10, wherein the uplink/downlink configuration information about a current Component Carrier (CC) is carried in the DCI message transmitted over each CC, or the uplink/downlink configuration information about the CCs aggregated at the terminal is carried in the DCI message transmitted in a primary cell of each terminal.

18. The method according to claim 13, wherein bits in the DCI message that are not used to indicate any uplink/downlink configuration information are set as a pre-agreed constant value.

19. A base station, comprising a processor and a data transceiver, wherein
the processor is configured to determine uplink/downlink configuration information and control the data transceiver to transmit the uplink/downlink configuration information to at least one terminal via a DCI message, so that the at least one terminal parses the DCI message in accordance with predetermined DCI configuration information and determines its own uplink/downlink configuration from the DCI message, the DCI message including at least one uplink/downlink configuration information domain, at least one of the uplink/downlink configuration information domains included in the DCI message being parsed by the at least one terminal, the uplink/downlink configuration information domain being configured to carry the uplink/downlink configuration information, and
the data transceiver is configured to receive and transmit data under the control of the processor,
wherein the DCI configuration information further comprises a length of a valid information domain in the DCI message, or a length of a vacant region in the DCI message.

20. A terminal, comprising a processor and a data transceiver, wherein
the processor is configured to control the data transceiver to receive a DCI message from a base station, the DCI message including at least one uplink/downlink configuration information domain, at least one of the uplink/downlink configuration information domains included in the DCI message being parsed by the terminal, and the uplink/downlink configuration information domain being configured to carry uplink/downlink configuration information, and
the data transceiver is configured to receive and transmit data under the control of the processor,
wherein the DCI configuration information further comprises a length of a valid information domain in the DCI message, or a length of a vacant region in the DCI message.

* * * * *